(12) United States Patent
Carremm et al.

(10) Patent No.: US 10,502,658 B2
(45) Date of Patent: Dec. 10, 2019

(54) SYSTEM FOR A SELF-ALIGNING EXHAUST SENSOR JOINT

(71) Applicant: Ford Global Technologies, LLC, Dearborn, MI (US)

(72) Inventors: Swadad A. Carremm, Canton, MI (US); Mahmoud Yousef Ghannam, Canton, MI (US); Rakeeb Kaid, Dearborn, MI (US); James W. Anderson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 15/699,947

(22) Filed: Sep. 8, 2017

(65) Prior Publication Data
US 2019/0078977 A1    Mar. 14, 2019

(51) Int. Cl.
*G01M 15/10*   (2006.01)
*F01N 11/00*   (2006.01)
*F01N 13/00*   (2010.01)
*F01N 13/18*   (2010.01)

(52) U.S. Cl.
CPC ......... *G01M 15/106* (2013.01); *F01N 11/002* (2013.01); *F01N 13/00* (2013.01); *F01N 13/008* (2013.01); *F01N 13/1855* (2013.01); *F01N 2560/08* (2013.01)

(58) Field of Classification Search
CPC .................................................. G01M 15/106
USPC ................. 73/114.76; 285/332, 332.1, 334.5
See application file for complete search history.

(56) References Cited

U.S. PATENT DOCUMENTS

| | | | |
|---|---|---|---|
| 3,752,509 A * | 8/1973 | Stafford | F16L 27/04 285/334.4 |
| 5,139,639 A | 8/1992 | Holleboom | |
| 5,329,806 A | 7/1994 | McClanahan et al. | |
| 6,560,526 B1 * | 5/2003 | Matekunas | F02D 41/1498 123/435 |
| 2012/0273079 A1 * | 11/2012 | Guclucan | F01D 25/18 138/109 |
| 2013/0056978 A1 * | 3/2013 | Swift | F16L 19/028 285/332 |
| 2014/0373821 A1 * | 12/2014 | Kitagawa | F01M 11/08 123/572 |
| 2016/0298798 A1 * | 10/2016 | Rickards | F16L 27/053 |
| 2018/0142812 A1 * | 5/2018 | Schoenborn | F16L 15/006 |

* cited by examiner

*Primary Examiner* — Nimeshkumar D Patel
*Assistant Examiner* — Jean F Morello
(74) *Attorney, Agent, or Firm* — Geoffrey Brumbaugh; McCoy Russell LLP

(57) ABSTRACT

Systems and methods are provided for a self-aligning exhaust sensor joint. In one example, a system may include a tapered pipe having a flange at its wider end; a nut having a head, an externally threaded bottom, and a tapered inner cavity that is adapted to fit around the tapered pipe; and a boss having a threaded inner cavity that is adapted to engage with the threaded bottom of the nut and having an engagement cavity for receiving the flange. By inserting the flange into the engagement cavity, mating the externally threaded bottom of the nut with the threaded inner cavity of the boss, and torquing the nut until a bottom surface of the externally threaded bottom pushes against the flange, a seal may be formed between the tapered pipe and the boss.

18 Claims, 6 Drawing Sheets

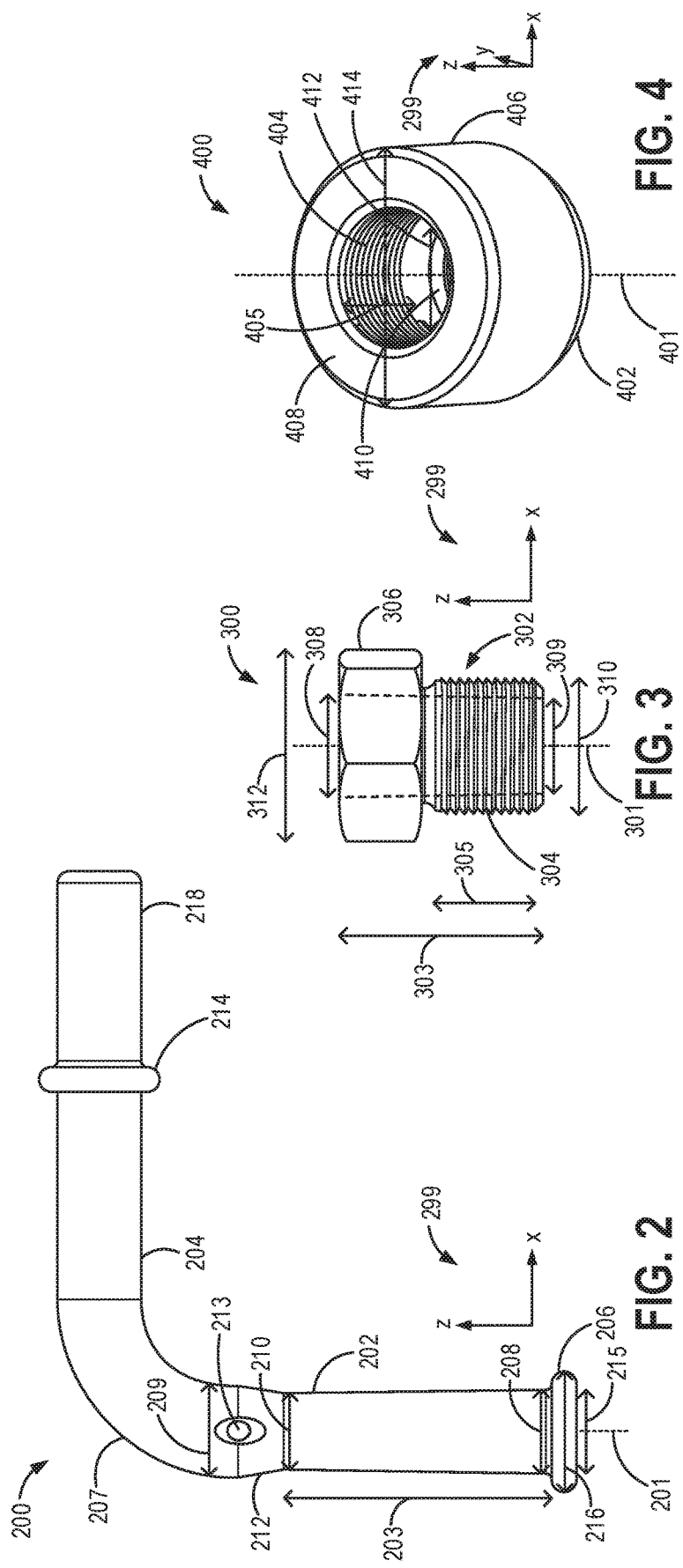

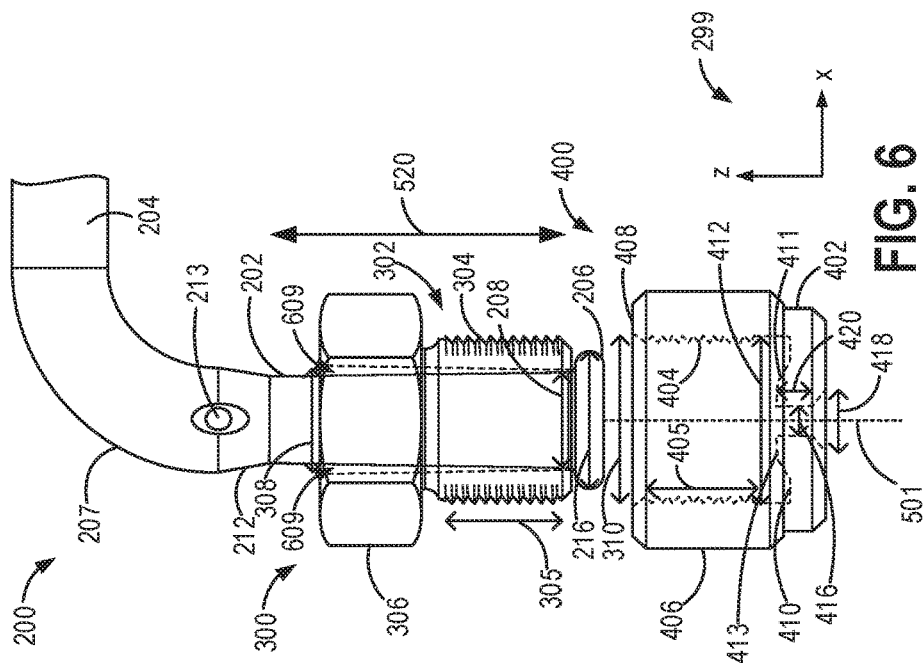
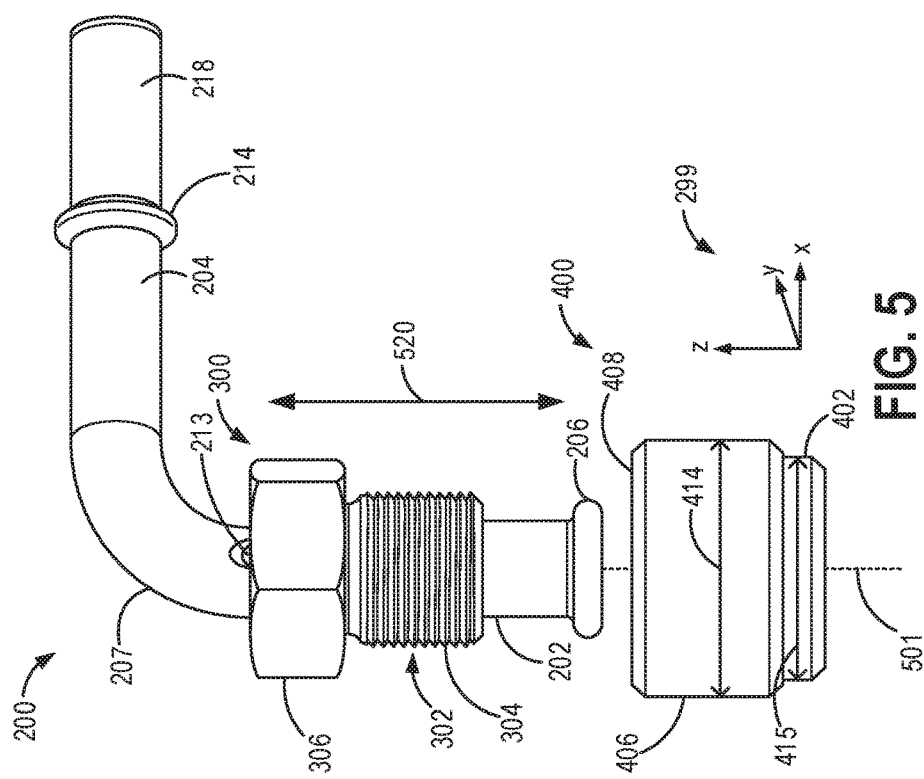

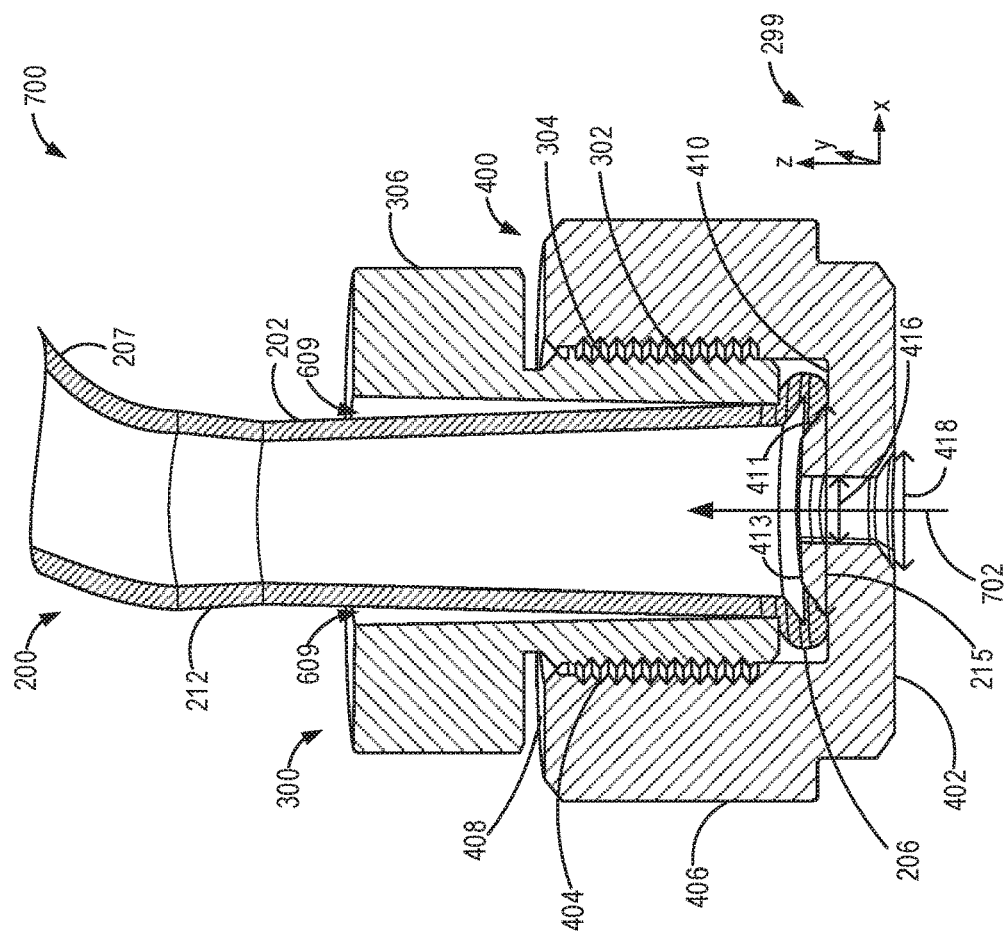
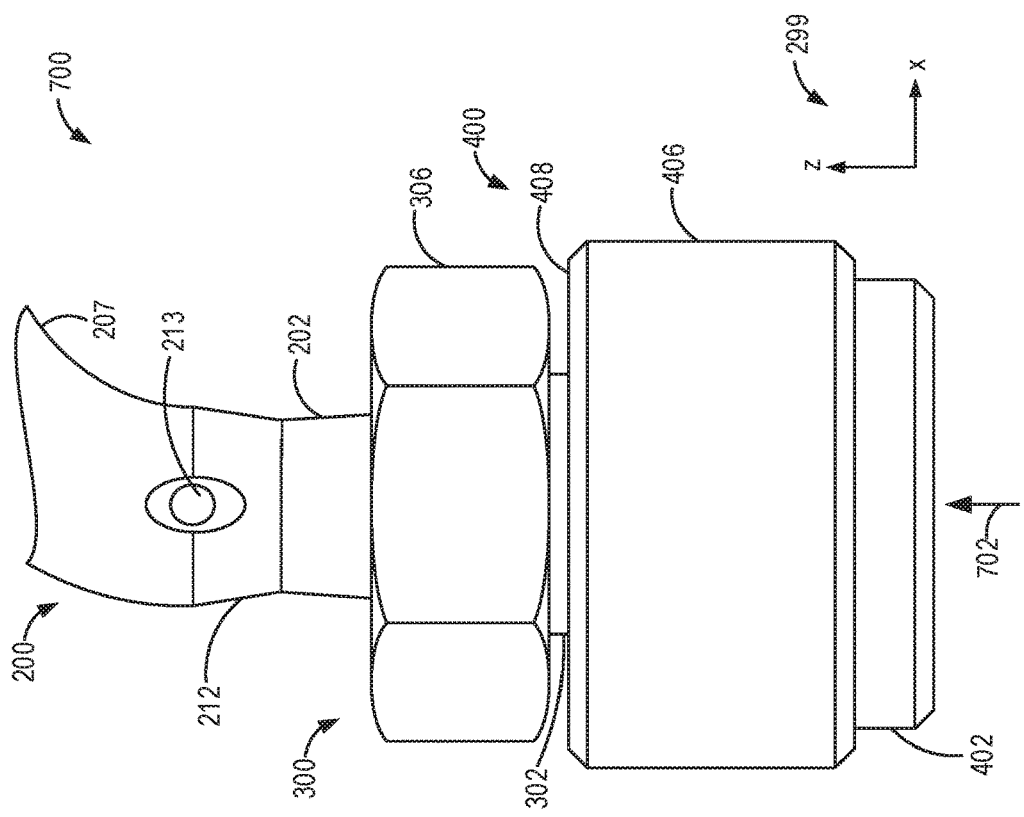

SYSTEM FOR A SELF-ALIGNING EXHAUST SENSOR JOINT

FIELD

The present description relates generally to systems and methods for an exhaust pressure sensor in a vehicle.

BACKGROUND/SUMMARY

Attachment of some sensors of a vehicle, such as exhaust pressure sensors, requires precise orientation of a tubing (or pipe) assembly to align the sensor with a fixed base (e.g., a boss) that is welded to an exhaust passage. Typically, the tubing assembly includes a press washer having a protrusion that matches a notch (e.g., a groove) in the fixed base, such that the press washer fits into the fixed base in a single orientation. Such an alignment constraint adds complexity to the sensor installation process. If the resulting joint between the tubing assembly and fixed base is misaligned, stress on the tubing assembly may be increased, leading to sensor degradation. In one example, if the tubing assembly does not align with other sensor components, the tubing may be torqued to force the alignment, putting strain on the sensor joint. As another example, the misalignment may press the exhaust sensor into other vehicle components, putting strain on the tubing assembly and the sensor joint that may degrade the sensor over time. As a result, to correct the misalignment, the fixed base may be removed, realigned, and re-welded, which increases the time and cost of sensor installation.

The inventors herein have recognized that by eliminating the opportunity for misalignment, sensor installation times and costs may be reduced. In one example, the issues described above may be addressed by a system comprising: a tapered pipe having a flange at its wider end; a nut assembly having a head, a cylindrical externally threaded bottom extending down from the head, and a tapered inner cavity adapted for positioning over the tapered pipe; and a boss having a threaded inner cavity, adapted to engage with the threaded bottom of the nut assembly, and an engagement cavity extending below the threaded inner cavity adapted to receive the flange. In this way, exhaust sensor joint alignment constraints may be reduced.

As one example, the nut assembly may be positioned around the tapered pipe, and the tapered pipe and the nut assembly may be freely rotatable around a common central axis. The tapered pipe and the boss may form a seal when the flange of the tapered pipe is inserted into the engagement cavity of the boss, the threaded bottom of the nut assembly is mated with the threaded inner cavity of the boss, and a bottom-most end of the threaded bottom presses the flange into the engagement cavity. Once the flange is pressed into the engagement cavity of the boss, further rotation of the tapered pipe may be prevented, with the tapered pipe held firmly in place by a downward force from the nut assembly. In this way, the tapered pipe may be inserted into the boss at any rotational orientation (with respect to the common central axis) and adjusted to align with other vehicle components until the nut assembly is torqued and pushes against the flange of the tapered pipe, eliminating re-welding of the boss due to joint misalignment. As a result, exhaust sensor installation times and costs may be reduced. Furthermore, due to the taper of the pipe and the tapered inner cavity of the nut, the tapered inner cavity of the nut may not contact outer walls of the pipe during the torquing process, reducing stress put on the pipe during sensor installation and thereby reducing sensor degradation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 illustrates a side view of a tapered pipe that may be included in an exhaust sensor joint.

FIG. 3 shows a side view of an internally tapered, externally threaded nut assembly that may be included in the exhaust sensor joint.

FIG. 4 depicts an angled top view of an internally threaded boss that may be included in the exhaust sensor joint.

FIG. 5 shows a first side view of the nut assembly arranged around the tapered pipe prior to engagement with the boss.

FIG. 6 shows a second side view of the nut assembly arranged around the tapered pipe prior to engagement with the boss.

FIG. 7 shows a side view of the tapered pipe and the nut assembly engaged with the boss to form the exhaust sensor joint.

FIG. 8 shows a cross-sectional side view of the tapered pipe and the nut assembly engaged with the boss to form the exhaust sensor joint.

FIGS. 2-9 are shown approximately to scale, although other relative dimensions may be used.

DETAILED DESCRIPTION

Figure 1:
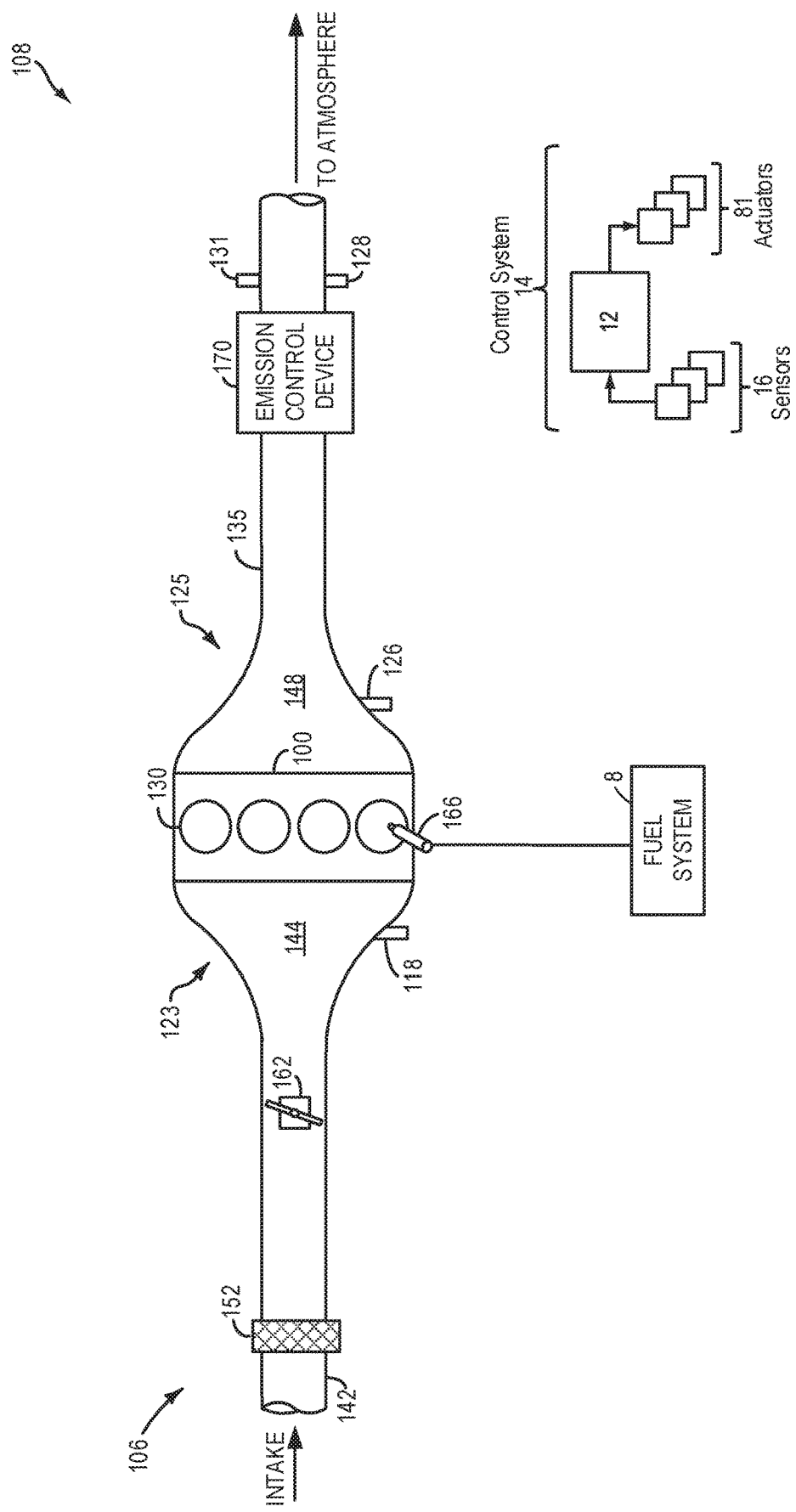
FIG. 1 shows a schematic depiction of a vehicle system.
Figure 9:
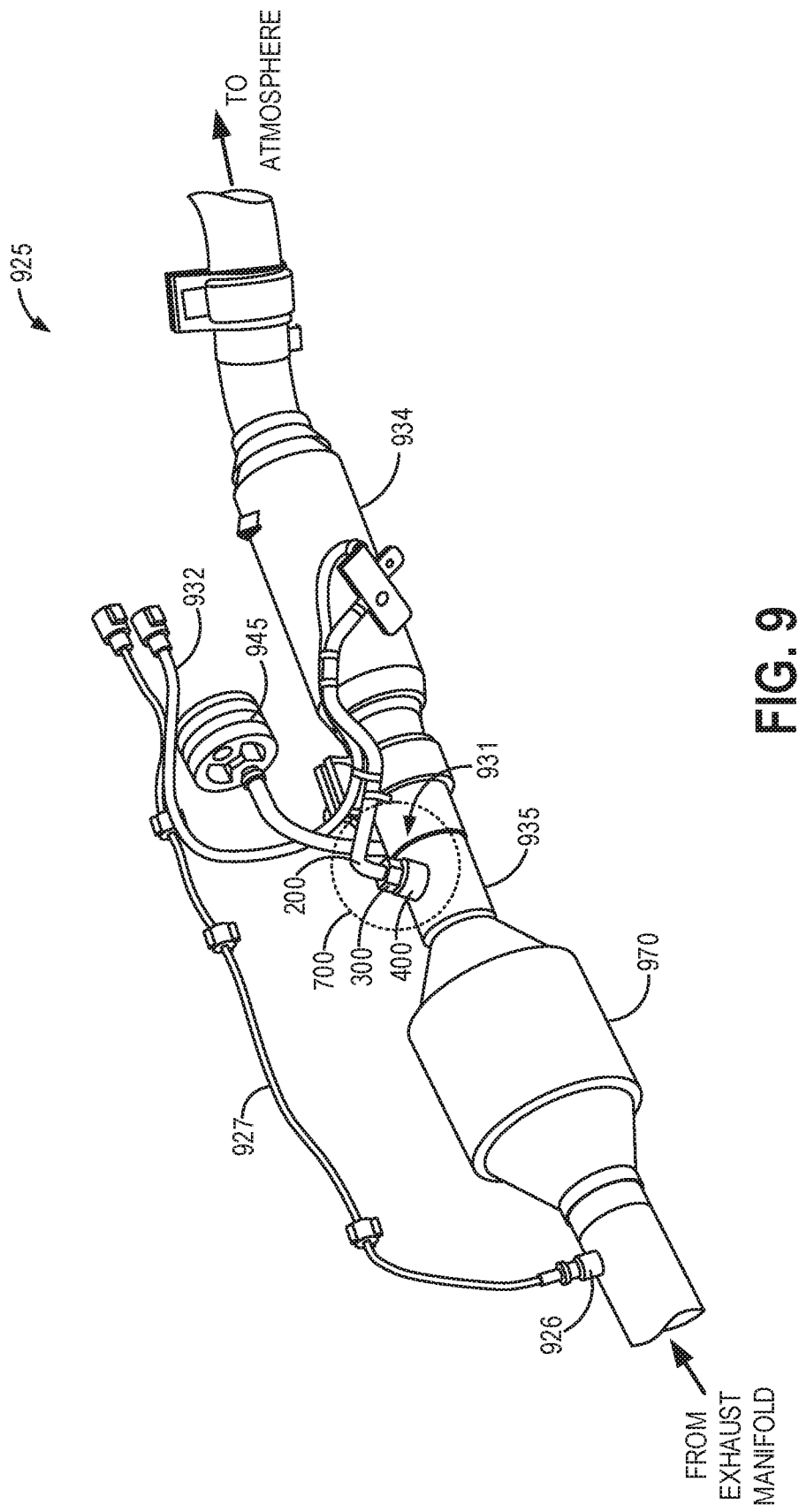
FIG. 9 shows the exhaust sensor joint coupled to an exhaust passage of an exhaust system.
Figure 10:
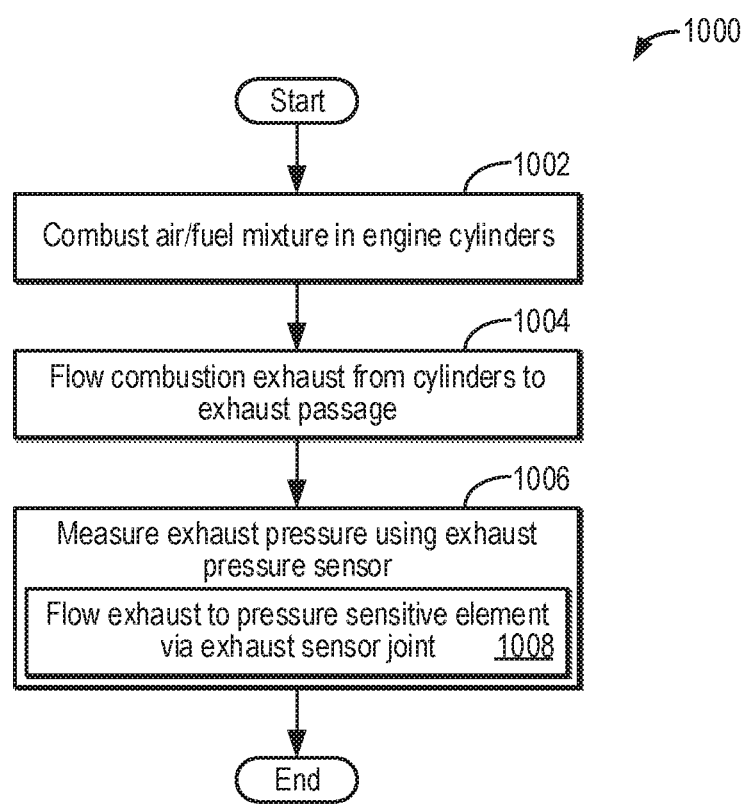
FIG. 10 shows a flowchart of an example method for measuring an exhaust pressure using an exhaust pressure sensor coupled to an exhaust passage via the exhaust sensor joint.

The following description relates to systems and methods for an exhaust sensor joint, which may be used to couple one or more sensors to a vehicle system, such as the example vehicle system shown in FIG. 1. The exhaust sensor joint may include a tapered pipe, such as the example tapered pipe shown in FIG. 2; a nut assembly with a slightly conical inner cavity (e.g., axial bore) and a cylindrical externally threaded bottom, such as the example nut shown in FIG. 3; and a cylindrical boss with a threaded inner cavity, such as the example boss shown in FIG. 4. In particular, the nut may be arranged around the tapered pipe, as illustrated in FIGS. 5 and 6, with the nut freely rotatable and vertically slidable over the tapered pipe and the tapered pipe freely rotatable within the nut assembly. The tapered pipe may be inserted into the threaded inner cavity of the boss, and the externally threaded bottom of the nut assembly may be mated with the threaded inner cavity of the boss to form the exhaust sensor joint, as shown in FIGS. 7 and 8. The exhaust sensor joint may be used to install an exhaust pressure sensor in an exhaust system, for example, as illustrated in FIG. 9. Notably, the exhaust sensor joint does not constrain the alignment of the exhaust pressure sensor during installation. FIG. 10 provides an example method for measuring the exhaust pressure with the exhaust pressure sensor installed via the exhaust sensor joint.

FIG. 1 shows a schematic depiction of a vehicle system 108 including an engine system 106. In one example, vehicle system 108 may be propelled by combustion of a fuel/air mixture within cylinders 130 of an engine 100 of engine system 106. In other examples, vehicle system 108 may be a hybrid vehicle system that can derive propulsion power from engine system 106 and/or an on-board energy storage device, such as a battery system (not shown). An energy conversion device, such as a generator (not shown), may be operated to absorb energy from vehicle motion and/or engine operation and then convert the absorbed energy to an energy form suitable for storage by the energy storage device.

Engine 100 of engine system 106 is configured to combust fuel received from a fuel system 8 and air within cylinders 130. Fuel from fuel system 8 may be injected into cylinders 130 by fuel injectors 166. Although only one fuel injector 166 is shown, it should be understood that each of cylinders 130 may include a fuel injector 166 coupled thereto. In this manner, fuel injectors 166 provide what is known as direct injection (hereafter also referred to as "DI") of fuel into cylinders 130. However, in other examples, fuel injectors 166 may be configured as port fuel injectors for injecting fuel upstream (e.g., into intake ports) of cylinders 130 (hereafter also referred to as "PFI"). In still other examples, fuel may be delivered from fuel system 8 to cylinders 130 through both DI and PFI.

Fuel system 8 may include one or more fuel tanks, fuel pumps, and fuel rails. For example, fuel tanks of fuel system 8 may store one or more liquid fuels, including (but not limited to) gasoline, diesel, and alcohol fuels. In some examples, the fuel may be stored on-board the vehicle as a blend of two or more different fuels. For example, fuel tanks of fuel system 8 may be configured to store a blend of gasoline and ethanol (such as E10, E85, etc.) or a blend of gasoline and methanol (such as M10, M85, etc.), whereby these fuels or fuel blends may be delivered to engine 100 as via fuel injectors 166. The air/fuel mixture within cylinders 130 may be ignited via compression or spark ignition via spark plugs (not shown) coupled to each of cylinders 130.

Engine system 106 includes an engine intake 123 (which may be referred to herein as an intake system) and an engine exhaust 125 (which may be referred to herein as an exhaust system). Engine intake 123 includes a throttle 162 fluidly coupled to an intake manifold 144 via an intake passage 142. Air may flow into intake passage 142, and particulate matter (e.g., dust, dirt, etc.) may be removed from the air via an air filter 152. An amount of air that enters intake manifold 144 may be varied by varying a position of throttle 162.

Engine exhaust 125 includes an exhaust manifold 148 leading to an exhaust passage 135 that routes exhaust gas to the atmosphere. Engine exhaust 125 may further include one or more emission control device 170 mounted in a close-coupled position and configured to receive exhaust gas flowing through exhaust passage 135. Emission control device 170 may include one or more emission control devices, such as various orders and/or combinations of a three-way catalyst, a lean NOx trap, a particulate filter (e.g., a diesel particulate filter or a gasoline particulate filter), an oxidation catalyst, etc. Exhaust gas may flow through emission control device 170 before exiting to the atmosphere.

Vehicle system 108 further includes control system 14, including a controller 12. Control system 14 receives information (e.g., electrical signals) from a plurality of sensors 16 (various examples of which are described herein) and sends control signals to a plurality of actuators 81 (various examples of which are also described herein). As one example, sensors 16 may include an exhaust gas sensor 126 located upstream of the emission control device, an exhaust temperature sensor 128, a manifold absolute pressure (MAP) sensor 118 coupled to intake manifold 144, and an exhaust pressure sensor 131 coupled to exhaust passage 135. Exhaust pressure sensor 131 may be coupled to exhaust passage 135 via an exhaust sensor joint. In particular, the exhaust sensor joint may be self-aligning with unconstrained installation, as further described with respect to FIGS. 5-8. Other sensors, such as additional pressure, temperature, air/fuel ratio, and composition sensors may be coupled to various locations in vehicle system 108. As another example, the actuators may include fuel injector 166, throttle 162, etc. Controller 12 receives signals from the various sensors 16 and employs the various actuators 81 to adjust engine operation based on the received signals and instructions stored on a memory of the controller. For example, controller 12 may receive an indication of exhaust pressure downstream of emission control device 170 via exhaust pressure sensor 131.

Controller 12 may be configured as a microcomputer including a microprocessor unit, input/output ports, read-only memory, random access memory, keep alive memory, a controller area network (CAN) bus, etc. Controller 12 may be configured as a powertrain control module (PCM) in some examples. The controller may receive input data from the various sensors 16, process the input data, and trigger the actuators 81 in response to the processed input data based on instruction or code programmed therein corresponding to one or more routines.

It will be appreciated that other components may be included in the engine such as additional valves, sensors, and actuators. In some embodiments, wherein engine system 106 is a boosted engine system, the engine system may further include a boosting device, such as a turbocharger (not shown).

FIGS. 2-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis (e.g., z-axis) of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIGS. 2-4 each show a single component of an exhaust sensor joint. FIGS. 5-8 show different perspectives and cross-sectional views of the relative arrangement of the components before and after the exhaust sensor joint is assembled, and FIG. 9 gives an example of the exhaust sensor joint installed in a vehicle system. As such, like components are numbered the same and may not be reintroduced. For example, the components described with respect to FIGS. 5-8 that have the same identification labels as the components in FIGS. 2-4 are the same components and operate as previously described. Reference axes 299 are included in each of FIGS. 2-8 in order to compare the views and relative orientations described below.

FIG. 2 is a side view of a pipe 200 that may be included in the exhaust sensor joint. Although FIG. 2 shows a two-dimensional view, it should be understood that pipe 200 has depth (e.g., in a y-direction of reference axes 299, which is not visible in FIG. 2). For example, pipe 200 may be a hollow cylinder, with the diameter of the cylinder varying, as further described below. An inner diameter of pipe 200 may vary proportionally with an outer diameter of pipe 200 such that a thickness of a pipe wall remains substantially constant, in some examples.

Pipe 200 includes a first pipe section 202 with a length 203 that tapers to a reducer (e.g., a reducing coupling) 212, through which the first pipe section 202 is coupled to an elbow joint 207. Reducer 212 may be a concentric reducer, for example. First pipe section 202 is vertical with respect to the z-axis of reference axes 299 and slightly conical with respect to a central axis 201. A first flange 206 is positioned at a bottom end of first pipe section 202 opposite reducer 212. First flange 206 may be an annular, rolled flange, for example. The outer and inner diameters of first pipe section 202 decrease (e.g., taper) up length 203 from first flange 206 to reducer 212 such that an outer diameter 208, which is nearer to first flange 206, is greater than an outer diameter 210, which is nearer to reducer 212. For example, first pipe section 202 may be tapered inward (e.g., toward central axis 201) in a range of 1-5 degrees from first flange 206 to reducer 212. Thus, first pipe section 202 is a tapered pipe. Reducer 212 tapers from elbow joint 207 to first pipe section 202 such that the outer and inner diameters of reducer 212 decrease as a distance from first pipe section 202 decreases. For example, reducer 212 may be outwardly tapered from central axis 201 in the direction of elbow joint 207. In this way, reducer 212 may have a larger diameter that matches that of elbow joint 207 (e.g., an outer diameter 209) where reducer 212 and elbow joint 207 couple and a smaller diameter that matches that of first pipe section 202 where reducer 212 and first pipe section 202 couple. Reducer 212 may be coupled to elbow joint 207 via a fastener 213. For example, fastener 213 may be a fixed pin, a stud, a weld nut, etc. Furthermore, fastener 213 may protrude from pipe 200, as will be further described below. In some examples, reducer 212 may be welded to first pipe section 202. In other examples, reducer 212 and first pipe section 202 may be coupled via a thread joint.

As shown in FIG. 2, elbow joint 207 may curve 90 degrees from reducer 212 to become horizontal with respect to reference axes 299, although other geometries are also possible. Elbow joint 207 is coupled to a second pipe section 204 on the end opposite reducer 212. Second pipe section 204 and elbow joint 207 may be welded together in some examples. In other examples, second pipe section 204 and elbow joint 207 may be coupled via a thread joint. Second pipe section 204 may have an outer diameter that is the same as outer diameter 209 of elbow joint 207. Furthermore, the outer (and inner) diameter of second pipe section 204 may be constant such that second pipe section 204 is a hollow cylinder. Outer diameter 209 of elbow joint 207 (and second pipe section 204) may be greater than outer diameter 208 of first pipe section 202, for example.

Second pipe section 204 may couple to a third pipe section 218 via a second flange 214. Second flange 214 may be a threaded flange, for example. In this way, second flange 214 may couple third pipe section 218 to second pipe section 204 in a removable fashion. This may enable various sensor components, such as pressure sensitive elements, to be coupled to pipe 200 for installation in an exhaust system in a vehicle. For example, third pipe section 218 may serve as an engagement section for a tube (not shown), with third pipe section 218 being inserted into the tube. Second flange 214 may serve as a stop for the tube so that the tube does not overlap or engage second pipe section 204. Furthermore, second flange 214 may provide a visual mark to ensure that third pipe section has been fully inserted (e.g., engaged within) the tube. For example, third pipe section 218 may be inserted into the tube until an end of the tube rests against second flange 214. Further still, the tube may be secured to third pipe section 218 with a clamp around both the tube and third pipe section 218 near second flange 214 (e.g., to the right of second flange 214, as drawn in FIG. 2). The tube may house the pressure sensitive elements of the sensor, for example. The outer (and inner) diameter of third pipe section 218 may be substantially similar to that of second pipe section 204, for example, and less than the inner diameter of the tube.

As shown, an outer diameter 216 of first flange 206 is greater than both outer diameter 208 and outer diameter 210 of first pipe section 202 as well as outer diameter 209 of elbow joint 207 (and second pipe section 204). As such, first flange 206 may serve as an attachment base for pipe 200 with the remaining components of the exhaust sensor joint, as will be described below. First flange 206 also has an inner diameter 215, which enables a fluid (e.g., exhaust gas) to flow through first flange 206 and into pipe 200. Once the exhaust gas enters pipe 200, the tapering of first pipe section 202 facilitates airflow smoothness through elbow joint 207 and pressure stability.

Turning next to FIG. 3, a side view of a nut assembly 300 with a central axis 301 is shown. Although FIG. 3 is a two-dimensional view, it should be understood that nut assembly 300 has depth (e.g., in a y-direction of reference axes 299, which is not visible in FIG. 3). Nut assembly 300 has a length 303, which is less than length 203 of first pipe section 202. Nut assembly 300 is hollow, as indicated by dashed lines, with a slightly conical inner cavity (e.g., axial bore). For example, the top of nut assembly 300 has an opening with an inner diameter 308, and the bottom of nut assembly 300 has an opening with an inner diameter 309, which is smaller than inner diameter 308. The inner cavity of nut assembly 300 may taper from inner diameter 308 to inner diameter 309 in a range of 1 to 5 degrees, for example. The taper of the inner cavity of nut assembly 300 is in the opposite direction of the taper of first pipe section 202 of pipe 200 with respect to reference axes 299. Both inner diameter 308 and inner diameter 309 are larger than outer diameter 208 of first pipe section 202 and smaller than outer diameter 216 of first flange 206 so that nut assembly 300 may fit around first pipe section 202 and not around first flange 206, as will be described with respect to FIGS. 5-8.

Nut assembly 300 is shown having a head 306 and a cylindrical threaded bottom 302. As a non-limiting example, head 306 is hexagonal in shape such that head 306 may be gripped by a wrench. However, other geometries are also possible. Threaded bottom 302 includes external threads 304 over a length 305, while the walls of the axial bore of nut assembly 300 may be smooth. Head 306 has an outer diameter 312, and threaded bottom 302 has an outer diameter 310. As shown, outer diameter 312 may be greater than outer diameter 310. However, in other examples, outer diameter 312 and outer diameter may be the same, or outer diameter 312 may be less than outer diameter 310.

FIG. 4 shows an angled view of a boss 400 having a central axis 401. As shown, boss 400 may be cylindrical. Boss 400 includes a bottom section 402, which may be welded to an exhaust passage of a vehicle (not shown). Thus, boss 400 may serve as a fixed base for securing the exhaust sensor joint to the exhaust passage. Boss 400 may further include a top surface 408 opposite bottom section 402 through a middle section 406. As will be elaborated below with respect to FIGS. 5-8, pipe 200 and nut assembly 300 may be guided into boss 400 through an opening in top surface 408 during exhaust sensor installation to form the exhaust sensor joint. As shown in FIG. 4, top surface 408 may have chamfered (e.g., beveled) edges. In other examples, top surface 408 may have rounded edges or right-angled edges.

Middle section 406 and top surface 408 have an outer diameter 414 and include a cylindrical inner cavity with an inner diameter 412. Inner diameter 412 may be a constant diameter throughout middle section 406 and may be matched to outer diameter 310 of threaded bottom 302 of nut assembly 300. Further, the inner cavity of middle section 406 includes internal threads 404 down a length 405, and thus may be referred to herein as a female threaded interior. External threads 304 of nut assembly 300 may be shaped to engage with the female threaded interior of boss 400. For example, length 305 of threaded bottom 302 may be substantially similar to length 405.

An engagement cavity 410 is formed by bottom section 402 and the inner cavity of middle section 406. Engagement cavity 410 may have a complementary shape to first flange 206 of pipe 200, as will be further described with respect to FIGS. 6 and 8. Inner diameter 412 is larger than outer diameter 216 of first flange 206 such that first flange 206 may fit through middle section 406 without contacting middle section 406. As such, first flange 206 may sit in engagement cavity 410 without contacting middle section 406.

Next, FIG. 5 shows a side view of nut assembly 300 arranged around first pipe section 202 of pipe 200. Nut assembly 300 and pipe 200 may both be lowered into the female threaded interior of boss 400 (not shown) during sensor joint assembly, as described further below. Nut assembly 300 may be placed around first pipe section 202 prior to the coupling of first pipe section 202 with reducer 212 (which is not visible in the example view of FIG. 5 due to the position of nut assembly 300). Nut assembly 300 may freely travel (e.g., slide) up and down first pipe section 202, as indicated by arrows 520. First flange 206 prevents nut assembly 300 from slipping off the bottom of pipe 200, as further described with respect to FIG. 6. Further, the bend of elbow joint 207 may prevent nut assembly 300 from traveling to second pipe section 204. In other examples, such as when fastener 213 protrudes from pipe 200, fastener 213 may prevent nut assembly 300 from sliding onto elbow joint 207, thereby preventing nut assembly 300 from squeezing elbow joint 207 and potentially becoming jammed during shipping or servicing. Further still, nut assembly 300 may be freely rotated around a common central axis 501 shared by nut assembly 300, first pipe section 202, and boss 400. Similarly, pipe 200 may be freely rotated around common central axis 501. For example, pipe 200 is rotated in the view shown in FIG. 5 compared with the view shown in FIG. 2, as indicated by the y-axis of reference axes 299.

As shown in FIG. 5, bottom section 402 of boss 400 may have an outer diameter 415 that is smaller than outer diameter 414 of middle section 406. This may help enable a gas-tight seal when boss 400 is welded to an exhaust passage, for example. Additionally, due to a radial symmetry of boss 400, bottom section 402 may be welded to the exhaust passage at any rotation with respect to common central axis 501.

Turning now to FIG. 6, a second side view is shown that highlights interior surfaces of nut assembly 300 and boss 400. Compared with FIG. 5, in FIG. 6, pipe 200 and nut assembly 300 are both rotated with respect to common central axis 501 and nut assembly 300 is farther down first pipe section, highlighting both the vertical movement available to nut assembly 300 (as indicated by arrows 520) and the free rotation available to both pipe 200 and nut assembly 300 prior to engagement with boss 400. For example, nut assembly 300 may not contact first pipe section 202 due to the taper of first pipe section 202 and the taper of the inner cavity of nut assembly 300, as indicated by gaps 609 between the interior surface of nut assembly 300 and the exterior surface of first pipe section 202. Gaps 609 have a variable width down the length of nut assembly 300, and the width further changes as nut assembly 300 is slid up and down pipe 200. For example, as the outer diameter of first pipe section 202 decreases and the inner diameter of nut assembly 300 increases, the distance between the outer surface of first pipe section 202 and the inner surface of nut assembly 300 increases, which in turn increases the width of gaps 609.

As mentioned above with respect to FIG. 4, middle section 406 of boss 400 (e.g., the inner cavity of boss 400) has an inner diameter 412. Inner diameter 412 is substantially similar to outer diameter 310 of threaded bottom 302 of nut assembly 300 such that threaded bottom 302 fits into the interior cavity of boss 400. Further, internal threads 404 over length 405 of the interior surface of middle section 406 are complementary to external threads 304 over length 305 of threaded bottom 302 (for clarity, only a portion of external threads 304 are shown in FIG. 6). For example, length 405 and 305 may be substantially similar so that when the external threads 304 of nut assembly 300 are fully engaged with internal threads 404 of boss 400, the entirety of external threads 304 may fit inside the inner cavity of boss 400, as will be described with reference to FIGS. 7 and 8.

Engagement cavity 410 extends below the inner cavity of boss 400 and is adapted to receive first flange 206 of pipe 200. Engagement cavity 410 further includes an angled section 411 that rises to a top surface 413. Engagement cavity 410 includes an opening with a first, smaller inner diameter 416 in top surface 413 that flares into a second, wider inner diameter 418 at the bottom surface of bottom section 402. As shown in FIG. 6, the opening may have a constant inner diameter 416 for a length 420 before the inner diameter gradually increases to inner diameter 418. As will be further shown with respect to FIG. 8, angled section 411 may have a complementary shape to the interior surface of first flange 206 of pipe 200.

During exhaust sensor joint assembly, first flange 206 of pipe 200 may be inserted into the inner cavity of boss 400, with first flange 206 pushed into engagement cavity 410. Then, external threads 304 of nut assembly 300 may be engaged (e.g., mated with) internal threads 404 of boss 400 and the nut torqued until a bottom surface of threaded bottom 302 pushes against first flange 206. In this way, first flange 206 may be pressed against engagement cavity 410 with a downward force, forming a tight seal. Notably, before first flange 206 is pressed against engagement cavity 410 by threaded bottom 302, nut assembly 300 may not contact first pipe section 202 due to the taper of first pipe section 202 and the taper of the inner cavity of nut assembly 300, reducing an amount of friction, horizontal stress, and angular stress exerted on first pipe section 202 while torquing nut assembly 300. Additionally, pipe 200 may retain free rotation around common central axis 501 prior to first flange 206 being pressed against engagement cavity 410 by threaded bottom 302. Once first flange 206 is pressed against engagement cavity 410 by the bottom surface of threaded bottom 302, pipe 200 may be fixed firmly in place and no longer rotatable.

Two side views of such an assembled exhaust sensor joint 700 are shown in FIGS. 7 and 8. Whereas FIG. 7 highlights the exterior surfaces, FIG. 8 shows a cross-sectional side view highlighting the engagement of pipe 200 and nut assembly 300 within boss 400. As described above, the assembled exhaust sensor joint 700 includes first flange 206 of pipe 200 engaged within boss 400, specifically in an engagement cavity 410 of boss 400, and held in place by nut assembly 300, the external threads 304 of nut assembly 300 mated with internal threads 404 of boss 400. Threaded bottom 302 of nut assembly 300 may be positioned within boss 400 such that external threads 304 are no longer externally visible, as shown in FIG. 7. For example, external threads 304 of nut assembly 300 may be engaged with internal threads 404 of boss 400, and head 306 of nut assembly 300 may be torqued until the bottom surface of threaded bottom 302 compresses first flange 206 of pipe 200 into engagement cavity 410 of boss 400. An opening in bottom section 402 of boss 400, as described with respect to FIG. 6, allows gas to flow into the assembled exhaust sensor joint in the direction of arrow 702.

As shown in FIG. 8, inner diameter 215 of first flange 206 is substantially similar to the diameter of engagement cavity 410 where angled section 411 begins. Further, a slope of angled section 411 may follow a slope of the inner surface of first flange 206 such that engagement cavity 410 provides a complementary surface to the inner surface of first flange 206. In this way, a tight seal may be formed between first flange 206 of pipe 200 and engagement cavity 410 of boss 400 when first flange 206 is pressed into engagement cavity 410 by the bottom-most surface of nut assembly 300. Gaps 609 again highlight how the inner cavity of nut assembly 300 may not contact first pipe section 202, reducing an amount of stress exerted on pipe 200 by nut assembly 300 during the torquing process. Further, outer diameter 216 of first flange 206 (as shown in FIG. 2) is less than inner diameter 412 of boss 400 (as shown in FIGS. 4 and 6) such that the sides of first flange 206 do not contact the walls of the inner cavity of boss 400.

In this way, pipe 200 may be inserted into boss 400 at any rotational orientation with respect to a central axis. With engagement cavity 410 shaped complementarily to first flange 206 and threaded bottom 302 of nut assembly 300 shaped complementarily to the threaded inner cavity of boss 400, the exhaust sensor joint may self-align as external threads 304 of nut assembly 300 are mated with internal threads 404 of boss 400 and the nut is torqued. Further, at the end of the torquing process, when the bottom-most surface of nut assembly 300 pushes against first flange 206, pipe 200 may be held fixedly in place, with a gas-tight seal forming between first flange 206 and engagement cavity 410 (and thus between pipe 200 and boss 400). This may enable accurate measurements to be taken by a sensor, such as an exhaust pressure sensor, installed in a vehicle via the exhaust sensor joint.

Turning now to FIG. 9, an example of an exhaust sensor 931 installed in an exhaust system 925 is shown. Exhaust system 925 may be included in a vehicle, such as in vehicle system 108 of FIG. 1, for example. In particular, exhaust sensor 931 is installed via exhaust sensor joint 700, which includes pipe 200, nut assembly 300, and boss 400. Like components of FIG. 9 and FIG. 1 are numbered similarly (e.g., exhaust system 925 of FIG. 9 corresponds to exhaust system 125 of FIG. 1) and may function as previously described with respect to FIG. 1.

As shown in FIG. 9, boss 400 is coupled to an exhaust passage 935 downstream of an emission control device 970 and upstream of an exhaust flex pipe 934. Exhaust system 925 may be attached to the vehicle via a hanger 945. Exhaust gas from an engine of the vehicle (such as engine 100 of FIG. 1) may flow from an exhaust manifold to exhaust passage 935, where an exhaust gas sensor 926 may measure an oxygen concentration of the exhaust gas, for example. An output (such as a voltage output) of exhaust gas sensor 926 may be transmitted to a controller of the vehicle (e.g., controller 12 of FIG. 1) via an electrical connection 927. Exhaust pressure sensor 931 may measure a pressure of the exhaust gas after it passes through emission control device 970. An output (such as a voltage output) of exhaust pressure sensor 931 may be transmitted to the controller via an electrical connection 932.

As described above, exhaust pressure sensor 931 may be installed by inserting a bottom flange (e.g., first flange 206) of pipe 200 into an engagement cavity of boss 400, mating external threads of nut assembly 300 with internal threads of boss 400, and then torquing nut assembly 300 until nut assembly 300 presses the bottom flange of pipe 200 into the engagement cavity of boss 400 and holds pipe 200 firmly in place. Until the torquing process is complete, pipe 200 may be rotated within boss 400, enabling pipe 200 to be precisely aligned with electrical connection 932, for example, while avoiding contact with other vehicle components. As an example, if instead pipe 200 could only fit into boss 400 at one rotational orientation, such as if pipe 200 included a notch and boss 400 included a corresponding groove, misalignment of boss 400 on exhaust passage 935 may prevent pipe 200 from being installed due to obstruction by other vehicle components (such as hanger 945). As a result, boss 400 may be removed, realigned, and re-welded in order to complete the installation of exhaust pressure sensor 131, adding time and cost to the installation process. Since boss 400 is radially symmetrical and the bottom flange of pipe 200 fits into the engagement cavity of boss 400 at any rotational orientation with respect to a common central axis (e.g., common central axis 501 of FIG. 5), boss 400 may be welded to exhaust passage 935 at any rotational orientation without misalignment occurring, reducing installation time and cost.

Next, FIG. 10 shows an example method 1000 for measuring an exhaust pressure in an engine system, such as the example engine system 106 of FIG. 1. For example, the exhaust pressure may be measured by an exhaust pressure sensor, such as exhaust pressure sensor 131 of FIG. 1, coupled to an exhaust passage. The coupling may include an exhaust sensor joint, such as exhaust sensor joint 700 described with respect to FIGS. 7-9, wherein a boss (e.g., boss 400) is fixedly coupled (e.g., welded) to the exhaust passage, and a pipe (e.g., pipe 200) is secured to the boss by a nut assembly (e.g., nut assembly 300). In particular, the pipe may freely rotate within the boss around a central axis prior to engaging the nut assembly with the boss, and engaging the nut assembly with the boss may not exert horizontal or angular stress on the pipe. Instructions for carrying out parts of method 1000 and the rest of the methods included herein may be executed by a controller (e.g., controller 12 of FIG. 1) based on instructions stored on a memory of the controller and in conjunction with signals received from sensors of the engine system, such as the sensors described above with reference to FIG. 1 (e.g., pressure sensor 131). The controller may employ engine actuators of the engine system to adjust engine operation according to the methods described below.

Method 1000 begins at 1002 and includes combusting an air/fuel mixture in cylinders (e.g., cylinders 130 of FIG. 1) of the engine. For example, fuel from a fuel system (e.g., fuel system 8 of FIG. 1) may be delivered to the cylinders via fuel injectors (e.g., fuel injectors 166 of FIG. 1), where the fuel is mixed with air, the amount of air controlled by adjusting an opening of an intake throttle (such as intake throttle 162 of FIG. 1). In one example, the amount of fuel to be delivered is empirically determined and stored in a predetermined lookup table or function, which may be indexed to engine operating conditions, such as engine speed and engine load, among other engine operating conditions (such as a desired air-fuel ratio). The controller may then determine a pulse-width of a control signal to send to the fuel injector actuator corresponding to the determined amount of fuel to be delivered.

At 1004, method 1000 includes flowing the combustion exhaust from the cylinders to the exhaust passage. For example, the exhaust may be expelled from the cylinder during an exhaust stroke, during which exhaust valve(s) of the cylinder are opened. With the exhaust valve(s) opened, the exhaust may flow out of the cylinder to an exhaust manifold (e.g., exhaust manifold 148 of FIG. 1) and on to the exhaust passage (e.g., exhaust passage 135 of FIG. 1).

At 1006, method 1000 includes measuring the exhaust pressure using the exhaust pressure sensor. Measuring the exhaust pressure using the exhaust pressure sensor further includes flowing the exhaust to a pressure sensitive element of the exhaust pressure sensor via the exhaust sensor joint, as indicated at 1008. As described above, if the exhaust sensor joint includes a pipe with a tapered section (e.g., first pipe section 202 of FIG. 3), the exhaust may flow to the pressure sensitive element more smoothly than when the tapered section is not included, resulting in less noise in the pressure measurements. The exhaust pressure sensor may output a voltage to the controller corresponding to the pressure of the exhaust. Following 1008, method 1000 ends.

In this way, by including a tapered pipe ending in a wider flange and a nut assembly with a slightly conical axial bore (e.g., inner cavity) and a cylindrical threaded exterior in an exhaust sensor joint, the pipe may be freely rotated during assembly of the exhaust sensor joint. Further, while the nut assembly is mated with a threaded interior of a boss that is fixedly coupled to an exhaust passage and torqued until a bottom surface of the nut assembly presses the wider flange of the pipe into a complementarily shaped engagement cavity of the boss, the nut assembly will not stress or bend the tapered pipe. Due to the free rotation of the pipe and a radial symmetry of the boss, the boss may be coupled to the exhaust passage at any rotation, reducing the complexity of the installation process, which may save time and reduce costs. Such free rotation of the pipe within the boss and the nut assembly prior to the bottom surface of the nut assembly pressing the wider flange of the pipe into the engagement cavity of the boss enables the pipe to be aligned with other vehicle components. Further, the complementary shape of the wider flange with the engagement cavity, the taper of the pipe, and the slightly conical axial bore of the nut assembly enable self-alignment of the exhaust sensor joint during the installation process.

The technical effect of included a tapered pipe in an exhaust sensor joint is that airflow through the exhaust sensor joint may be stabilized and horizontal and angular stress on the pipe may be avoided while assembling the exhaust sensor joint.

As one example, a system, comprises: a tapered pipe having a flange at its wider end; a nut assembly having a head, a cylindrical externally threaded bottom extending down from the head, and a tapered inner cavity adapted for positioning over the tapered pipe; and a boss having a threaded inner cavity, adapted to engage with the threaded bottom of the nut assembly, and an engagement cavity extending below the threaded inner cavity adapted to receive the flange. In the preceding example, additionally or optionally, the boss is fixedly coupled to an exhaust passage of a vehicle system. In any or all of the preceding examples, additionally or optionally, the nut assembly is positioned around the tapered pipe. In any or all of the preceding examples, additionally or optionally, the tapered pipe and the nut assembly are freely rotatable around a common central axis, and the nut assembly is slidable over the tapered pipe above the flange. In any or all of the preceding examples, additionally or optionally, wherein the tapered pipe and the boss form a seal when the flange of the tapered pipe is positioned within the engagement cavity of the boss, the threaded bottom of the nut assembly is mated with the threaded inner cavity of the boss, and a bottom-most end of the threaded bottom of the nut assembly presses the flange into the engagement cavity. In any or all of the preceding examples, additionally or optionally, pressing the flange into the engagement cavity with the bottom-most end of the threaded bottom prevents further rotation of the tapered pipe.

As another example, a system comprises: an engine, including a plurality of cylinders; an intake manifold coupled to the engine for supplying air to the cylinders; an exhaust system, including an exhaust manifold coupled to the engine and an exhaust passage coupled to the exhaust manifold; and an exhaust pressure sensor coupled to the exhaust passage via an exhaust sensor joint, the exhaust sensor joint including a tapered pipe, a nut assembly having a tapered axial bore, and a boss having a threaded inner cavity adapted to receive the nut assembly. In the preceding example, additionally or optionally, a direction of taper of the tapered pipe is opposite that of a direction of taper of the tapered axial bore of the nut assembly. In any or all of the preceding examples, additionally or optionally, the tapered pipe includes a flange at its wider end and the nut assembly includes a threaded bottom extending down from a head, the threaded bottom having cylindrical external threads. In any or all of the preceding examples, additionally or optionally, an inner diameter of the tapered axial bore is less than an outer diameter of the flange. In any or all of the preceding examples, additionally or optionally, the inner diameter of the tapered axial bore is greater than an outer diameter of the tapered pipe. In any or all of the preceding examples, additionally or optionally, the boss includes an engagement cavity extending below the threaded inner cavity, the engagement cavity shaped complementarily to an interior of the flange of the tapered pipe and including an opening that extends to a bottom-most surface of the boss. In any or all of the preceding examples, additionally or optionally, the tapered pipe is positioned within the tapered axial bore of the nut assembly, the flange of the tapered pipe is inserted within the engagement cavity of the boss, and the threaded bottom of the nut assembly is engaged with the threaded inner cavity of the boss. In any or all of the preceding examples, additionally or optionally, the threaded bottom of the nut assembly is engaged with the threaded inner cavity of the boss by torquing the nut assembly until a bottom-most surface of the threaded bottom presses the flange of the tapered pipe into the engagement cavity of the boss to form a seal between the flange and the engagement cavity. In any or all of the preceding examples, additionally or optionally, torquing the nut assembly exerts vertical force on the flange of the tapered pipe but not horizontal or angular force on the tapered pipe.

As a further example, a method comprises: combusting an air/fuel mixture in cylinders of an engine; flowing combustion exhaust from the cylinders to an exhaust passage fluidly coupled to the engine; and measuring a pressure of the combustion exhaust with an exhaust pressure sensor coupled to the exhaust passage via an exhaust sensor joint, the exhaust sensor joint including a boss fixedly coupled to the exhaust passage and a tapered pipe secured to the boss by a nut assembly. In the preceding example, additionally or optionally, the boss includes a cylindrical threaded inner cavity and the nut assembly includes a cylindrical externally threaded bottom, the cylindrical externally threaded bottom of the nut assembly shaped to engage with the cylindrical threaded inner cavity of the boss. In any or all of the preceding examples, additionally or optionally, the nut assembly includes a tapered inner cavity therethrough, a direction of taper of the tapered inner cavity of the nut assembly opposite that of a direction of taper of the tapered pipe, and the nut assembly is positioned around the tapered pipe. In any or all of the preceding examples, additionally or optionally, the cylindrical externally threaded bottom of the nut assembly is mated with the cylindrical threaded inner cavity of the boss, and a flange positioned at a wider end of the tapered pipe is pressed within an engagement cavity that extents below the threaded inner cavity of the boss by a bottom-most surface of the cylindrical externally threaded bottom of the nut assembly. In any or all of the preceding examples, additionally or optionally, a pressure-sensitive element of the pressure sensor is coupled to the tapered pipe.

In another representation, a method comprises: positioning a nut assembly, having a tapered inner cavity, over a tapered pipe having an annular flange at its wider end so that the inner cavity is slidable over the pipe above the flange, the nut assembly also having cylindrical outer threads extending down from the nut assembly with the inner cavity extending therethrough; inserting the flange into a threaded inner cavity of a base and pushing the flange into an engagement cavity of the base that extends below the threaded inner cavity; and mating the cylindrical out threads of the nut assembly to the threaded inner cavity of the base and torquing the nut until a bottom-most end of the cylindrical outer threads pushes against the flange to form a seal between the base and the tapered pipe. In a first example of the method, the engagement cavity is shaped complementary to an interior surface of the flange and includes an opening therethrough. In a second example of the method, which optionally includes the first example, the tapered pipe is freely rotatable within the threaded inner cavity around a common axis shared by the tapered pipe, the nut assembly, and the base until the bottom-most end of the cylindrical outer threads pushes against the flange. In a third example of the method, which optionally includes one or more of the first and second examples, a pressure sensor is coupled to the tapered pipe.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a tapered pipe having a flange at its wider end;
a nut assembly having a head, a cylindrical externally threaded bottom extending down from the head, and a tapered inner cavity adapted for positioning over the tapered pipe, the tapered inner cavity having a direction of taper opposite that of a direction of taper of the tapered pipe; and
a boss having a threaded inner cavity, adapted to engage with the threaded bottom of the nut assembly, and an engagement cavity extending below the threaded inner cavity adapted to receive the flange.

2. The system of claim 1, wherein the boss is fixedly coupled to an exhaust passage of a vehicle system.

3. The system of claim 1, wherein the nut assembly is positioned around the tapered pipe.

4. The system of claim 3, wherein the tapered pipe and the nut assembly are freely rotatable around a common central axis, and the nut assembly is slidable over the tapered pipe above the flange.

5. The system of claim 4, wherein the tapered pipe and the boss form a seal when the flange of the tapered pipe is positioned within the engagement cavity of the boss, the threaded bottom of the nut assembly is mated with the threaded inner cavity of the boss, and a bottom-most end of the threaded bottom of the nut assembly presses the flange into the engagement cavity.

6. The system of claim 5, wherein pressing the flange into the engagement cavity with the bottom-most end of the threaded bottom prevents further rotation of the tapered pipe.

7. A system, comprising:
an engine, including a plurality of cylinders;
an intake manifold coupled to the engine for supplying air to the plurality of cylinders;
an exhaust system, including an exhaust manifold coupled to the engine and an exhaust passage coupled to the exhaust manifold; and
an exhaust pressure sensor coupled to the exhaust passage via an exhaust sensor joint, the exhaust sensor joint including a tapered pipe, a nut assembly having a tapered axial bore, a direction of taper of the tapered axial bore opposite that of a direction of taper of the tapered pipe, and a boss having a threaded inner cavity adapted to receive the nut assembly.

8. The system of claim 7, wherein the tapered pipe includes a flange at its wider end and the nut assembly includes a threaded bottom extending down from a head, the threaded bottom having cylindrical external threads.

9. The system of claim 8, wherein an inner diameter of the tapered axial bore is less than an outer diameter of the flange.

10. The system of claim 9, wherein the inner diameter of the tapered axial bore is greater than an outer diameter of the tapered pipe.

11. The system of claim 8, wherein the boss includes an engagement cavity extending below the threaded inner cavity, the engagement cavity shaped complementarily to an interior of the flange of the tapered pipe and including an opening that extends to a bottom-most surface of the boss.

12. The system of claim 11, wherein the tapered pipe is positioned within the tapered axial bore of the nut assembly, the flange of the tapered pipe is inserted within the engagement cavity of the boss, and the threaded bottom of the nut assembly is engaged with the threaded inner cavity of the boss.

13. The system of claim 12, wherein the threaded bottom of the nut assembly is engaged with the threaded inner cavity of the boss by torquing the nut assembly until a bottom-most surface of the threaded bottom presses the flange of the tapered pipe into the engagement cavity of the boss to form a seal between the flange and the engagement cavity.

14. The system of claim 13, wherein torquing the nut assembly exerts vertical force on the flange of the tapered pipe but not horizontal or angular force on the tapered pipe.

15. A method, comprising:
combusting an air/fuel mixture in cylinders of an engine;
flowing combustion exhaust from the cylinders to an exhaust passage fluidly coupled to the engine; and
measuring a pressure of the combustion exhaust with an exhaust pressure sensor coupled to the exhaust passage via an exhaust sensor joint, the exhaust sensor joint including a boss fixedly coupled to the exhaust passage and a tapered pipe secured to the boss by a nut assembly positioned around the tapered pipe, the nut assembly including a tapered inner cavity therethrough that has a direction of taper opposite that of a direction of taper of the tapered pipe.

16. The method of claim 15, wherein the boss includes a cylindrical threaded inner cavity and the nut assembly includes a cylindrical externally threaded bottom, the cylindrical externally threaded bottom of the nut assembly shaped to engage with the cylindrical threaded inner cavity of the boss.

17. The method of claim 16, wherein the cylindrical externally threaded bottom of the nut assembly is mated with the cylindrical threaded inner cavity of the boss, and a flange positioned at a wider end of the tapered pipe is pressed within an engagement cavity that extends below the cylindrical threaded inner cavity of the boss by a bottom-most surface of the cylindrical externally threaded bottom of the nut assembly.

18. The method of claim 17, wherein a pressure-sensitive element of the pressure sensor is coupled to the tapered pipe.

* * * * *